July 20, 1965
W. B. BOMAR, JR
3,195,731
SPECTACLES DISPLAY RACK
Filed Dec. 18, 1963
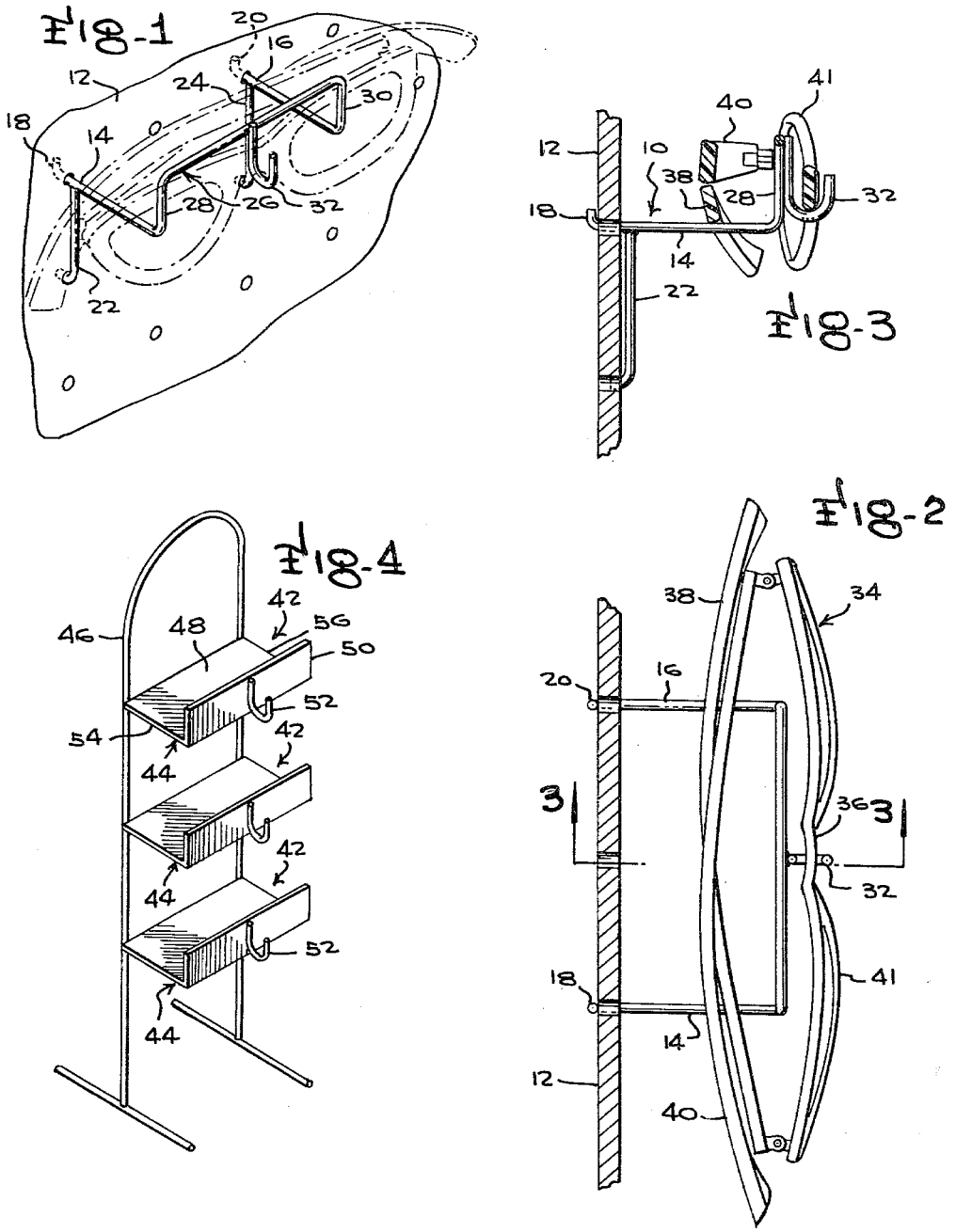
INVENTOR.
WELDON B. BOMAR, JR.
BY
McMorrow, Berman & Davidson
ATTORNEYS 3,195,731
SPECTACLES DISPLAY RACK
Weldon B. Bomar, Jr., 4423 Merrell Road, Dallas, Tex.
Filed Dec. 18, 1963, Ser. No. 331,571
8 Claims. (Cl. 211—13)

This invention pertains to holders for spectacles or eyeglasses and, in particular, to a rack for displaying the same.

It is already known that spectacles can be displayed in racks, either singularly or in large numbers, with the spectacles open or closed. However, none of the prior art devices permits the quick and easy insertion and removal of folded spectacles without any binding forces exerted against such movement and, yet, retains the highly important quality of providing stability of support to prevent lateral or longitudinal displacement of the spectacles, or side-to-side rocking thereof.

Therefore, it is an object of this invention to eliminate all of the foregoing deficiencies and provide a display rack for spectacles wherein the spectacles are securely supported to prevent lateral or longitudinal displacement or side-to-side rocking, and yet may be easily and quickly removed from and replaced on the rack.

Another object of the invention is to provide a display rack for spectacles which may be used to support a single pair of spectacles or combined with others to support and display a plurality of spectacles or eyeglasses.

A further object of the invention is to provide a display rack for spectacles which is especially adapted for supporting spectacles in folded condition to conserve valuable display space and, thereby, display approximately twice as many spectacles in the same area as those racks previously known.

A still further object is to provide a display rack for spectacles which is simple in construction, economical to fabricate, and may be manufactured from a wide selection of material, such as sheet or wire stock of metal, plastic, and wood.

With the foregoing and other objects in view which will appear as the description proceeds, the invention resides in the combination and arrangement of parts and in the details of construction hereinafter described and claimed, it being the intention to cover all changes and modifications of the examples of the invention herein chosen for purposes of disclosure, which do not constitute departures from the spirit and scope of the invention.

The invention is illustrated in the accompanying drawings, wherein:

FIGURE 1 is a perspective view of one form of the display rack mounted upon a peg board, with spectacles supported thereon and shown in broken lines;

FIGURE 2 is a top view of the rack of FIGURE 1, with the spectacles shown in full line and the peg board in cross section;

FIGURE 3 is an elevational view taken along line 3—3 of FIGURE 2; and

FIGURE 4 is a perspective view of another form of the invention.

Referring now to the form of the invention displayed in FIGURES 1, 2, and 3, reference numeral 10 designates, generally, the display rack mounted upon a peg board 12.

A pair of substantially horizontal, spaced, parallel rods 14, 16 project laterally from the associated peg board 12 and are supported thereon at one end by upturned ends 18, 20, and depending legs 22, 24 which are carried by each of the rods 14, 16, adjacent to but spaced from the upturned ends 18, 20, as shown in FIGURES 1 and 3.

Formed integrally with the projecting ends of the rods 14, 16 is an inverted U-shaped rod 26 whereby the legs 28, 30 of the rod 26 are connected, respectively, to the parallel rods 14, 16.

A nose bridge support 32 in the form of a hook is positioned substantially midway between the rods 14, 16 and is fixedly secured to the U-shaped rod 26 at its midpoint by appropriate means, such as soldering. The nose bridge support 32 projects from the rod 26 away from parallel rods 14, 16 in a substantially vertical plane.

The spectacles 34 rest securely on the display rack 10 with its nose bridge 36 received by the nose bridge support 32, and its bows or temples 38, 40 resting upon the shelf-like support of the parallel rods 14, 16 in closed or folded position. When the spectacles 34 are in place, the U-shaped rod 26 is located between the bows 38, 40 and the lenses 41, as shown in FIGURE 2.

Referring now to FIGURE 4 which illustrates a modification of the invention, it will be seen that the same inventive concept is present, that the rack may be supported on a self-standing base if desired, and that the rack may be combined with others to form a display rack having a plurality of the individual racks disposed thereon.

The modified form 42 shown in FIGURE 4 is formed of suitable sheet material and has a general L-shaped configuration corresponding to that of the form shown in FIGURES 1, 2, and 3. Each of the racks 42 includes an L-shaped support 44 connected to the stand or base 46 by suitable means, such as soldering. The support 44 has one leg 48 which is arranged substantially horizontally to function as a shelf and a shorter leg 50 rising upwardly from the horizontal leg 48 in the form of an elongated wall functioning as an anti-displacement means.

A nose bridge support 52 is mounted upon the face of the leg 50 remote from the leg 48, and projects therefrom in a substantially vertical plane midway between the side edges 54, 56 of the horizontal leg 48.

Spectacles may be mounted upon one or a plurality of the racks 42 in the same manner as in the form shown in FIGURES 1, 2, and 3.

It should be noted that the rods 14, 16, FIGURES 1, 2 and 3, perform the same function as the horizontal leg 48, FIGURE 4, to from a shelf or bow support for supporting the crossed bows of folded spectacles. The inverted U-shaped rod 26 of the form shown in FIGURES 1, 2 and 3 functions in the same manner as the vertical leg 50 in FIGURE 4 to provide a transversely extending anti-displacement means which is spaced from the end of the bow support that is secured to the support means. Such support means is the combined structure of the peg board 12, upturned ends 18, 20 and depending legs 22 in the form of FIGURES 1, 2 and 3, and is the stand 46 in the form of FIGURE 4 or any of these elements or their substantial equivalent.

What is claimed is:

1. A spectacle display rack comprising:
   (a) support means,
   (b) means for supporting the crossed bows of folded spectacles having one end connected to said support means,
   (c) anti-displacement means carried by said bow support means and spaced from said one end thereof,
   (d) and nose bridge support means carried by said anti-displacement means on the portion thereof facing away from said one end of said bow support means.

2. A spectacle display rack comprising:
   (a) support means,
   (b) substantially horizontally extending means for supporting the crossed bows of folded spectacles having one end connected to said support means,
   (c) transversely extending anti-displacement means rising from said bow support means and spaced from said one end thereof,
   (d) and nose bridge support means carried by said anti-displacement means on the portion thereof facing away from said one end of said bow support means.

3. The spectacle display rack of claim 1 in which there are a plurality of bow support means, anti-displacement means, and nose bridge support means.

4. A spectacle display rack comprising:
(a) support means,
(b) an L-shaped support having one leg arranged substantially horizontally and connected to said support means at its free end, the other leg of said L-shaped support extending upwardly from said one leg,
(c) and a nose bridge support on the side of said other leg remote from said one leg.

5. A spectacle display rack comprising:
(a) support means,
(b) a substantially horizontal bow support for supporting the crossed bows of folded spectacles and connected to said support means at one end,
(c) an upstanding elongated wall on said bow support extending transversely thereof adjacent the other end and adapted to be positioned between the crossed bows and the lenses of the spectacles when mounted on said rack,
(d) and a nose bridge support carried by said wall on the side thereof remote from said one end of said bow support.

6. A spectacle display rack comprising:
(a) support means,
(b) a substantially horizontal shelf for supporting the crossed bows of folded spectacles and connected to said support means at one end,
(c) an upstanding elongated wall on the other end of said shelf extending transversely thereof and adapted to be positioned between the crossed bows and the lenses of the spectacles when mounted on said rack,
(d) and a nose bridge support carried by said wall on the side thereof remote from said one end of said shelf.

7. A spectacle display rack comprising:
(a) support means,
(b) a pair of substantially horizontal spaced parallel rods for supporting the crossed bows of folded spectacles and each connected to said support means at one end,
(c) an inverted U-shaped rod having its ends connected to the other ends of said parallel rods,
(d) and a nose bridge support on said U-shaped rod projecting away from said parallel rods.

8. A spectacle display rack comprising:
(a) support means,
(b) a pair of substantially horizontal spaced parallel rods for supporting the crossed bows of folded spectacles and each connected to said support means at one end,
(c) an inverted U-shaped rod having its ends connected to the other ends of said parallel rods,
(d) and a hook projecting perpendicularly from said U-shaped rod away from said parallel rods.

References Cited by the Examiner
UNITED STATES PATENTS

| | | | |
|---|---|---|---|
| 547,470 | 10/95 | Zesterman | 248—300 |
| 1,421,196 | 6/22 | Fennimore | 206—80 |
| 2,104,612 | 1/38 | Droll | 24—3 |
| 2,226,684 | 12/40 | Wortham | 248—302 |
| 2,241,205 | 5/41 | Kimber | 248—300 |
| 2,411,361 | 11/46 | Bongiovanni | 248—300 |
| 2,491,515 | 12/49 | Orchard | 248—99 |
| 2,623,722 | 12/52 | Glunt et al. | 248—300 |
| 2,826,387 | 3/58 | Rutten | 248—229 |
| 2,949,683 | 8/60 | Glover | 35—49 |
| 2,958,495 | 11/60 | Foster | 248—176 |
| 2,997,270 | 8/61 | Farnon | 248—309 |
| 3,091,423 | 5/63 | Butterworth | 248—225 |

CLAUDE A. LE ROY, *Primary Examiner.*